July 22, 1947.  M. P. GRAHAM ET AL  2,424,455
JOINT
Filed Oct. 16, 1944
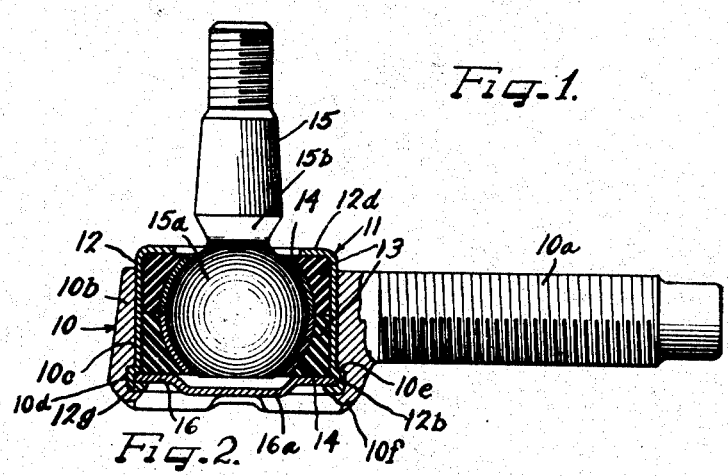
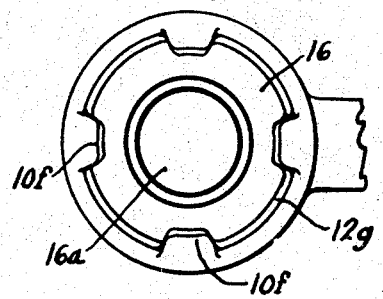
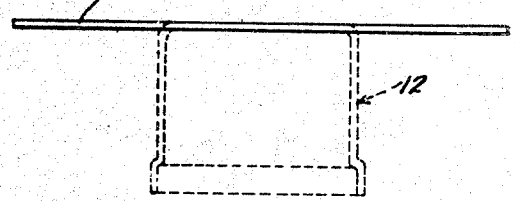
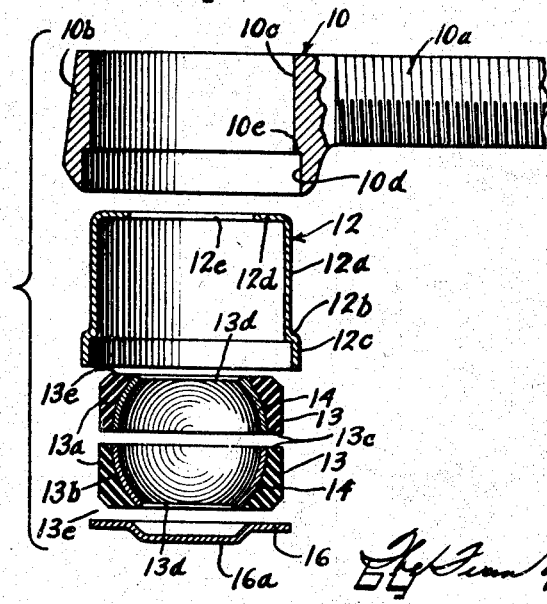
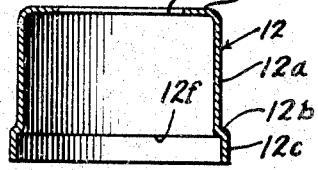
Inventors
MATTHEW P. GRAHAM
JAMES H. BOOTH Patented July 22, 1947

2,424,455

UNITED STATES PATENT OFFICE 2,424,455

JOINT

Matthew P. Graham and James H. Booth, Detroit, Mich., assignors to Thompson Products, Inc., Cleveland, Ohio, a corporation of Ohio Application October 16, 1944, Serial No. 558,833

8 Claims. (Cl. 287—90)

This invention relates to joints with inexpensive insert assemblies and housings.

Specifically the invention deals with a tie rod joint including an eye-ended tie rod end carrying, in the eye end thereof, a replaceable insert assembly composed of a sheet metal casing, rubber bushings, and a stud member.

The invention will be hereinafter specifically described as embodied in a tie rod joint, but it should be understood that the principles of this invention are broadly applicable to joints in general.

The rod joints include housings or end sockets which are relatively expensive. In the past, these sockets have provided a bearing wall for joint parts and, when this wall became worn, the entire socket had to be replaced. In addition, the conventional tie rod joint includes a closure plug for the socket which must be bodily removed to give access to the joint parts, and if any of the joint parts become worn or broken, the socket has to be either internally threaded to permit removal of the plug, or spun to hold the plug. A threaded socket, of course, is very expensive, and the spun socket would be damaged, probably beyond use, when the plug was removed.

According to the present invention, a housing or socket carries an insert unit composed of a casing, bushings, bearing members, and stud. This insert unit is readily inserted in the eye end of an inexpensively formed socket or housing. The casing of the insert unit is provided with an outturned peripheral flange which seats on a shoulder in the eye end of the socket or housing, and the socket or housing is crimped over the end of the casing at several places to clamp the casing in the eye end of the socket or housing. When any of the joint parts become worn, the crimped parts of the socket or housing are bent back, chiseled off, or ground off and the entire insert unit is bodily removed from the socket or housing to be replaced by a new assembly. The new assembly is held in position by crimping other parts of the socket or housing over the end of the new casing.

The casing is inexpensively made of sheet metal. An inexpensive sheet metal disk is spun into the casing to hold the joint parts therein. The assembly enclosed by the thus plugged casing is a unit that can be sold as such for replacement of similar units in sockets or housings which are not subjected to wear. Such relatively wear-free sockets or housings have a much longer life than the heretofore-used bearing type socket.

A feature of this invention, therefore, is the provision of a joint assembly including a housing that can be repeatedly used with a series of insert units, and thereby outlast a number of such units.

Another feature of the invention resides in utilizing an inexpensive eye-ended stemmed member as a tie rod housing or socket thereby avoiding expensive forging and finishing operations heretofore required.

An object of the invention is to provide inexpensive joints with housings directly receiving insert units containing the joint parts.

A further object of the invention is to decrease the cost of tie rod ends.

Another object of the invention is to provide ball and socket joints including sockets receiving replaceable joint assemblies.

A further object of the invention is to provide a unit composed of a ball stud, rubber bushed bearings for the ball stud, and an inexpensive casing retaining the bushings and stud, and adapted to be readily inserted in a tie rod housing.

A specific object of the invention is to provide a joint assembly including an inexpensive casing having an outturned flange and a spun-in plug seated on the internal shoulder provided by the flange, together with a housing having an internal shoulder bottoming the outturned flange to retain the casing in a housing.

Other and further objects of the invention will be apparent to those skilled in the art from the following detailed description of the annexed sheet of drawings which, by way of preferred example only, illustrates one embodiment of the invention.

On the drawings:

Figure 1 is a side elevational view, with parts in vertical cross section, of a ball and socket tie rod joint according to this invention.

Figure 2 is a fragmentary bottom plan view of the joint of Figure 1.

Figure 3 is a side elevational view of a sheet of metal from which the casing for the joint of this invention can be made, and illustrating, in dotted lines, the manner in which the sheet of metal is stamped to provide the casing.

Figure 4 is a vertical cross-sectional view of the casing for the joints of this invention.

Figure 5 is an exploded vertical cross-sectional view, with parts in side elevation, of the housing, casing, bushings and casing closure plug for the joints of this invention, showing the manner in which these parts are assembled.

As shown on the drawings:

In Figure 1, the reference numeral 10 designates a tie rod housing having an externally threaded stem 10a for threaded insertion into the end of a tie rod, and an eye end 10b. The eye end 10b has a straight cylindrical bore 10c therethrough which is countersunk at one end to provide an enlarged cylindrical bore 10d terminating in a shoulder 10e inwardly from the countersunk end.

The housing 10 is inexpensive to manufacture, since it can be formed by a simple forging process and then need only be roughly internally broached to provide the bore 10c and a counterbore 10d.

The eye end of the housing receives an insert unit 11 composed of a casing 12, a pair of rubber rings 13 carrying hemispherical socket liners 14, a ball stud 15 with a ball end 15a riding on the liners 14, and a closure plug 16 holding the bushing rings 13 in the casing.

The casing 12 of the insert unit 11, as shown in Figure 3, is readily stamped from a sheet of metal 17 to provide a cup as shown in dotted lines. The casing 12, as shown in Figure 4, is formed from the cup of Figure 3 and has a cylindrical side wall 12a with an outturned flange 12b near the open end thereof and a rim wall 12c extending from the flange 12b to the open end. The casing has an end wall 12d with an aperture 12e therethrough. The aperture 12e is formed by a punching operation simultaneously with the stamping or drawing operation.

The resulting casing 12 has an internal shoulder 12f between the side wall 12a and rim wall 12c.

The side wall 12a of the casing 12, as best shown in Figure 5, has an outside diameter for snugly fitting the bore 10c of the housing 10 and the rim wall 12c has a diameter for snugly fitting the counterbore 10d of the housing. The shoulder 10e of the housing bottoms the flange 12b of the casing as shown in Figure 1.

As shown in Figure 5, the bushing rings 13 have cylindrical outer walls 13a snugly fitting in the side wall 12a of the casing 12. These bushing rings are formed of rubber or other resiliently deformable material, such as synthetic plastics or the like.

The rings 13 have segmental spherical recesses 13b converging from one end face 13c thereof to a reduced-diameter aperture 13d in the other end face 13e thereof.

The recesses 13b are lined with the segmental spherical liners 14 which can be composed of fabric, metal, plastics or the like. The liners 14 are preferably composed of synthetic resin-impregnated canvas. A phenolic resin can be used to provide a good wearable bearing surface for the ball end 15a of the stud.

The two rings 13 cooperate to provide a ball socket, and the end faces 13c of the rings are abutted together. The end face 13e of one ring is bottomed on the end wall 12d of the casing and the aperture 13d in this ring is somewhat smaller than the aperture 12e of the casing, so that the stud neck 15b can project freely through both apertures.

The end face 13e of the other ring 13 receives the closure disk 16 thereagainst. This disk 16 preferably has a depressed central portion 16a that is spaced from the ball end 15a and the liner 14 for the ring 13. The disk 16 is bottomed on the internal shoulder 12f of the casing, and the rim wall 12c of the casing is spun over the peripheral margin portion of the closure disk 16 as at 12g to clamp the disk between the shoulder 12f and the spun-over portion 12g.

In order to hold the insert unit 11 in the housing 10 the flange 12b of the casing 12 is forced against the shoulder 10e of the housing by crimped-over localized portions 10f of the counterbored housing part as best shown in Figure 2. These crimped-over portions 10f overlie the spun-over portion 12g of the casing.

The portions 10f are spaced around the periphery of the housing 10 and are readily bent inwardly by a hammer or a punch from the rim end of the housing skirt portion containing the counterbore 10d. While four portions 10f are illustrated, two or three portions could be used.

When it is desired to replace the insert unit 11 with a new unit, the crimped portions 10f are chiseled or ground off, or are merely bent back to clear the casing rim 12c. The end wall 12d of the casing is then merely tapped to drop the entire unit out of the housing. The new unit 11 is inserted in the housing, and several additional portions of the counterbored part of the housing are crimped over the new unit to lock it in place.

The rubber rings 13 are preferably somewhat loaded by the casing 12 so that the liners 14 will have good bearing contact with the ball end 15a of the stud and, as wear occurs, the loaded rubber will continue to urge the liners into good bearing relationship with the ball end. The closure disk 16 for the casing therefore preferably holds the rubber rings in the casing with a compressive force.

The liners 14 are preferably vulcanized to the rubber rings.

As is customary in ball and socket joints, the ball end 15a of the stud 15 rocks and rotates in the liners 14.

From the above descriptions it will be understood that the invention now provides a tie rod joint with an inexpensive eye-ended socket or housing capable of receiving a series of insert units. These insert units are composed of inexpensive casings containing the joint parts, which preferably include rubber bushing rings, socket-defining liners for these bushing rings, and the head end of a stud.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A joint comprising an open-ended housing having an internal shoulder, an insert unit in said housing having an outturned portion bottomed on said shoulder, said housing having crimped portions overlying the insert unit to clamp the outturned portion of the unit on said shoulder, and said crimped portions alternating with uncrimped portions of the housing adapted to be crimped for clamping other inserts in the housing.

2. A joint construction comprising a socket member having a bore therethrough and a counterbore at one end cooperating therewith to provide a shoulder, a casing in said bore of the housing having an outturned portion bottomed on said shoulder and a rim portion in said counterbore, a closure part in said casing, said casing having a portion of the rim thereof deformed to secure the closure part in the casing, and said housing having localized deformed parts overlying the deformed part of the casing rim to secure the casing in the housing, a joint stud in said casing having a shank projecting freely through an end wall of the casing opposite the closure part for the casing, and bearing wall defining means in said casing for said stud.

3. A joint construction comprising an open-ended housing, an insert unit for said housing composed of a casing, bearing members, and a stud member, said casing having an outturned portion, and localized deformed parts on said housing thrusting against the casing to clamp the outturned portion of the casing against the housing.

4. A tie rod end comprising a housing having an eye end and a stem projecting therefrom, said eye end having an internal shoulder and a deformable skirt portion depending therefrom, an insert unit for said housing having a casing adapted to fit into the eye end of the housing and equipped with an outturned portion for seating on said shoulder, and said deformable skirt of the housing being locally deformed to overlie the casing for clamping the outturned portion thereof against said shoulder.

5. A joint construction comprising a ball stud, rubber rings surrounding the ball end of the stud, liners carried by said rings providing bearing walls for said ball end of the stud, a casing receiving said rubber rings and having an apertured end wall bottoming one of the rings, a closure part for said casing thrusting against the other of said rings to provide an insert unit assembly, and a housing removably receiving said insert unit assembly and having deformable portions adapted to overlie the assembly for retaining it in position.

6. A ball and socket tie rod joint comprising a stud having a shank and a ball end, a pair of rubber rings surrounding the ball end of the stud, bearing members in said rubber rings receiving said ball end of the stud to provide a ball socket, a stamped metal casing having an apertured end wall receiving said stud shank freely through the aperture thereof and bottoming one of said rings, said casing having an outturned flange adjacent the other end thereof and a rim portion extending from said flange, a closure disk in said rim portion of the casing bottomed on the shoulder provided by said outturned flange, said rim portion of the casing being spun over the peripheral margin of said disk to thrust the disk against the adjacent rubber ring and hold it between the shoulder provided by the outturned flange and the spun-over portion, and a housing having a stem for attachment to a tie rod and with an eye end thereon receiving said casing therethrough and having an internal shoulder bottoming said outturned flange of the casing, said eye end of the housing having a deformable skirt portion adjacent said internal shoulder thereof, and localized crimped portions on said skirt overlying the spun portion of the casing to lock the casing against the shoulder of the housing.

7. An insert unit for tie rod joint housings and the like comprising a metal cup casing having an apertured end wall at one end thereof and an enlarged rim portion at the other end thereof cooperating with a side wall portion to provide internal and external shoulders, a stud having a shank projecting freely through the aperture of said end wall and a head seated in said casing, bearing members in said casing surrounding the head of the stud, a closure disk for said casing in said rim portion thereof bottomed on said internal shoulder, said rim portion of the casing being deformed over said closure disk to clamp the disk against said internal shoulder, and said external shoulder of the casing adapted to bottom the assembly in a housing.

8. A joint comprising an open ended housing with an internal shoulder and a deformable skirt portion, and a self-contained insert unit in said housing, said unit including a headed stud, bearing members for the stud head, a casing surrounding the bearing members and head of the stud, and a closure member secured to said casing for sealing the bearing members in the casing, and said skirt portion of the housing being deformed against the casing to clamp the casing in the housing against the internal shoulder thereof.

MATTHEW P. GRAHAM.
JAMES H. BOOTH.

REFERENCES CITED

The following references are of record in the file of this patent:

UNITED STATES PATENTS

| Number | Name | Date |
|---|---|---|
| 1,814,999 | Benjamin | July 14, 1931 |
| 1,909,100 | Geyer | May 16, 1933 |
| 1,989,116 | Strauss | Jan. 29, 1935 |
| 2,325,845 | Flumerfelt | Aug. 3, 1943 |
| 1,824,271 | Hufferd | Sept. 22, 1931 |
| 941,605 | Baekeland | Nov. 30, 1909 |
| 2,361,025 | Graham et al. | Oct. 24, 1944 |
| 2,128,087 | Gatke | Aug. 23, 1938 |